(12) United States Patent
Obuse et al.

(10) Patent No.: US 6,616,248 B2
(45) Date of Patent: Sep. 9, 2003

(54) AUTOMOTIVE ANTI-LOCK BRAKE CONTROL SYSTEM

(75) Inventors: Naoki Obuse, Nagano (JP); Jun Yamashita, Nagano (JP)

(73) Assignee: Nissin Kogyo Co., Ltd., Nagano-ken (JP)

(*) Notice: Subject to any disclaimer, the term of this patent is extended or adjusted under 35 U.S.C. 154(b) by 0 days.

(21) Appl. No.: 10/021,361

(22) Filed: Dec. 19, 2001

(65) Prior Publication Data

US 2002/0053830 A1 May 9, 2002

(30) Foreign Application Priority Data

Dec. 28, 2000 (JP) ...................... P.2000-402687

(51) Int. Cl.[7] .............................................. B60T 8/36
(52) U.S. Cl. ............................ 303/119.3; 303/DIG. 10
(58) Field of Search ..................... 303/119.2, DIG. 10, 303/119.3, 113.1, 1, 20

(56) References Cited

U.S. PATENT DOCUMENTS

| | | | | |
|---|---|---|---|---|
| 5,988,770 A | * | 11/1999 | Volz | ........................ 303/119.3 |
| 6,079,798 A | * | 6/2000 | Hosoya | ................... 303/119.3 |
| 6,396,226 B2 | * | 5/2002 | Schmider et al. | ........... 318/254 |
| 6,396,238 B1 | * | 5/2002 | Miyahara | .................... 318/807 |
| 6,416,139 B2 | * | 7/2002 | Warner et al. | ........... 303/119.3 |
| 6,443,536 B1 | * | 9/2002 | Tracht et al. | ............ 303/119.3 |

FOREIGN PATENT DOCUMENTS

| | | |
|---|---|---|
| JP | 8-11691 | 1/1996 |
| JP | 2000-016264 | 1/2000 |

* cited by examiner

*Primary Examiner*—Christopher P. Schwartz
*Assistant Examiner*—Melanie Torres
(74) *Attorney, Agent, or Firm*—McGuireWoods LLP

(57) ABSTRACT

In an automotive anti-lock brake control system, solenoid portions of electromagnetic valves and an electronic control unit for controlling the energizing of an electric motor are accommodated in a cover which is joined to a housing. Provided on the substrate of the control unit are a positive side conductive line having a relay circuit interposed at a position along the length thereof and connected to the motor, and a negative side conductive line connected to the motor and allowed to function as a negative side power supply line for the substrate. The positive and negative side conductive lines are connected to ends of a battery via motor coupler terminals. A capacitor electric component acting as a countermeasure against the noise attributed to the electric motor is mounted on the substrate so as to provide a connection between the positive and negative side conductive lines.

10 Claims, 8 Drawing Sheets

AUTOMOTIVE ANTI-LOCK BRAKE CONTROL SYSTEM

BACKGROUND OF THE INVENTION

The present invention relates to an automotive anti-lock brake control system, and more particularly to an improved automotive anti-lock brake control system in which valve portions of electromagnetic valves for controlling brake hydraulic pressures of wheel brakes and hydraulic pumps are accommodated in a housing. Further, solenoid portions which constitute the electromagnetic valves in cooperation with the valve portions protrude from one side of the housing, and an electric motor for driving the hydraulic pumps is joined to another side of the housing. Moreover, an electronic control unit for controlling the energizing of the electric motor and the solenoid portions and a cover for covering the solenoid portions are joined to the one side of the housing, and a coupler is provided on the cover for connection with an external electric circuit.

Conventionally, a control system of this type is known in, for example, Japanese Patent Unexamined Publication No. Hei.8-11691.

Incidentally, noise attributed to electromagnetic waves occurred from an electric motor of an anti-lock brake system may be generated from the on-board radio while the anti-lock brake control system is in operation. In order to prevent the generation of such noise, it is known as a well-accepted technology to connect in parallel an electric component such as a capacitor for countermeasure against noise to the electric motor.

Referring to FIG. 9, a conventional technology will be described in which an electric component is used as a countermeasure against noise. A positive side conductive line 46 having a relay circuit 45 interposed at an intermediate position along the length thereof is provided on a substrate 17 of an electronic unit 16. The positive side conductive line 46 connecting a motor coupler terminal 37P that is to be connected to a positive terminal of a battery 48 with a positive terminal 39P of an electric motor 12. A motor coupler terminal 37N that is to be connected to a negative terminal of the battery 48 is connected to a negative terminal 39N of the electric motor 12 without passing through the substrate 17. A pair of substrate coupler terminals 38P, 38N is connected to the substrate 17. The terminals 38P, 38N are connected to positive and negative terminals of the battery 48, respectively, and independent from the respective coupler terminals 37P, 37N. Moreover, an electric component such as a capacitor for countermeasure against noise is mounted on the substrate 17 so as to be interposed between the conductive line 46 and the substrate coupler terminal 38N that is connected to the negative side of the battery 48.

However, a power supply line on the electric motor 12 including the positive side conductive line 46 is formed by a conductor having a large cross-sectional area. On the other hand, a power supply line for the substrate 17 is formed by a conductor having a cross-sectional area which is made relatively small. Accordingly, if there occurs a disconnection along the line connecting the substrate coupler terminal 38N and the substrate 17, the relay circuit 45 becomes unstable, resulting in the possibility that the electric motor 12 is activated unintentionally.

SUMMARY OF THE INVENTION

The present invention was made in view of the situation, and an object thereof is to provide an automotive anti-lock brake control system which prevents the generation of noise attributed to the electric motor and avoids allowing only the substrate side of the electric control unit to be put in a non-grounded condition so that an undesired activation of the electric motor is prevented.

The above-mentioned object can also be achieved by an automotive anti-lock brake control system, according to the present invention, comprising:

electromagnetic valves 5A to 5D, 6A to 6D, having valve portions 5a, 6a and solenoid portions 5b, 6b for controlling brake hydraulic pressures of wheel brakes BA to BD, respectively;

hydraulic pumps 11A, 11B for generating the brake hydraulic pressures;

a housing 20 accommodating the valve portions 5a, 6a of the electromagnetic valves and the hydraulic pumps 11A, 11B, wherein the solenoid portions 5b, 6b of the electromagnetic valves 5A to 5D, 6A to 6D protrude from one side 21a of the housing;

an electric motor 12 joined to another side 20b of the housing 20 for driving the hydraulic pumps 11A, 11B;

an electronic control unit 16 for controlling the energizing of the electric motor 12 and the solenoid portions 5b, 6b;

a cover 21 joined to the one side 20a of the housing for covering the solenoid portions 5b, 6b and the electronic control unit 16;

a coupler 35 provided on the cover 21 for connection with an external electric circuit, the coupler 35 having positive and negative motor coupler terminals 37P, 37N which are connected to ends of an external power source 48 respectively;

a substrate 17 provided in the electronic control unit 16;

a positive side conductive line 46 having one end connected to a positive terminal 39P of the electric motor 12 and the other end connected to the positive motor coupler terminal 37P, the positive side conductive line 46 having a relay circuit 45 interposed at a position along the length thereof, and the positive side conductive line 46 provided on the substrate 17;

a negative side conductive line 47 having one end connected to a negative terminal 39N of the electric motor 12 and the other end connected to the negative motor coupler terminal 37N, the negative side conductive line 47 provided on the substrate 17 so as to function as a negative side power supply line for the substrate 17; and an electric component 50 mounted on the substrate 17 for preventing a generation of noise attributed to the electric motor 12, the electric component 50 connecting the positive side conductive line 46 to the negative side conductive lines 47.

In the above-mentioned automotive anti-lock brake control system according to the present invention, the electric component may be a capacitor 50.

In addition, in the above-mentioned automotive anti-lock brake control system according to the present invention, the external power source may be a battery 48.

According to the construction described above, since the electric component acting as the countermeasure against noise is connected to the electric motor in parallel, noise attributed to electromagnetic waves generated from the electric motor is prevented from being generated in on-board equipment such as a radio. Moreover, since the positive side and negative side conductive lines which continue to the positive and negative terminals of the electric motor, respectively, are provided on the substrate of the electric control unit with the negative side conductive line being used as the substrate negative side power supply line, there occurs no status in which only the substrate side is put in a non-grounded condition to thereby avoid allowing the relay circuit on the substrate to become unstable, whereby the possibility can be eliminated that the electric motor is activated unintentionally.

BRIEF DESCRIPTION OF THE DRAWINGS

The invention will be better understood from reading the description which will follow, which is given merely by way of example and made with reference to the appended drawings, in which.

DETAILED DESCRIPTION OF THE PREFERRED EMBODIMENT

A mode for carrying out the invention will be described below based on an embodiment illustrated in the appended drawings.

Figure 1:
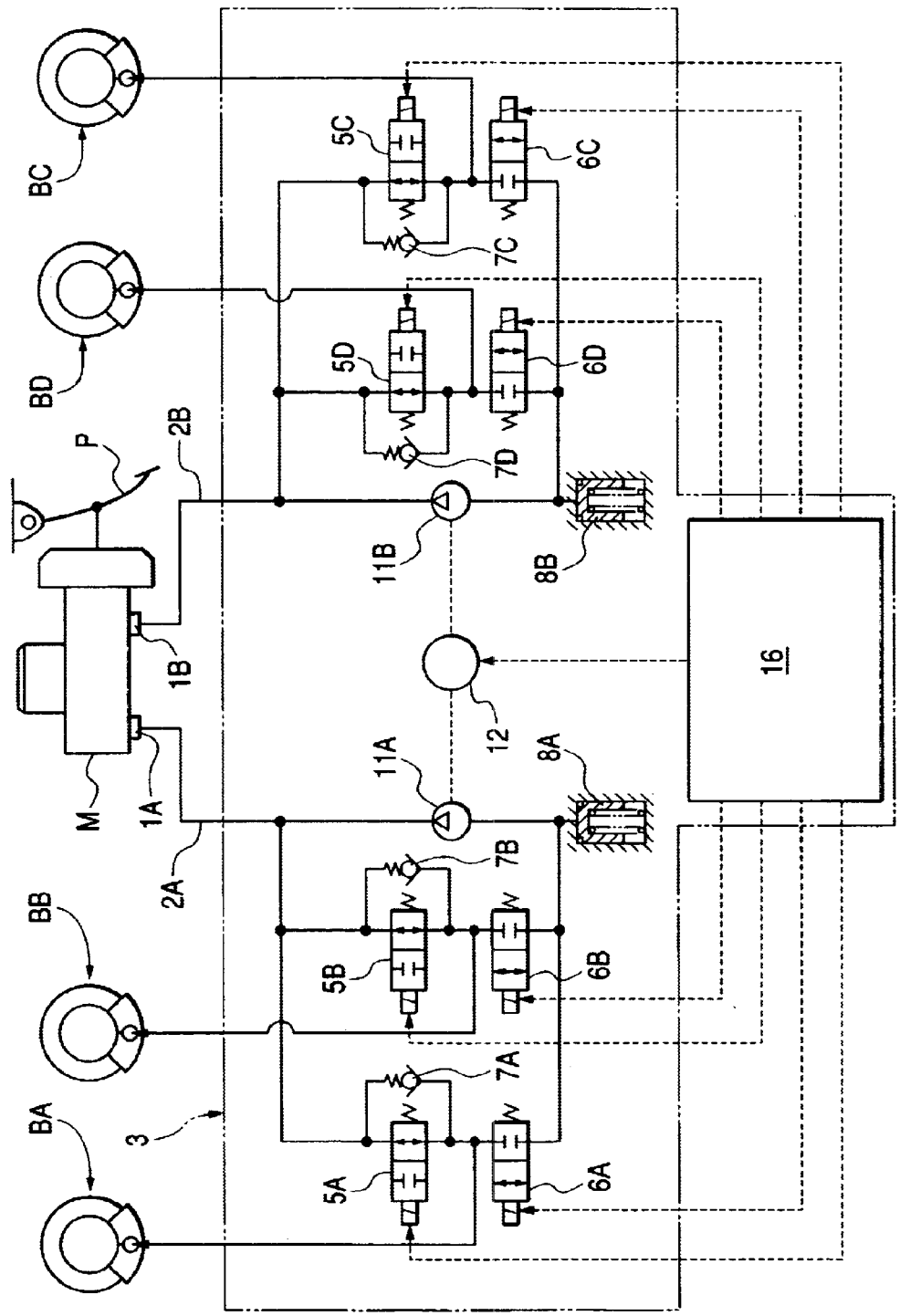
FIG. 1 is a brake hydraulic pressure circuit diagram.
Figure 2:
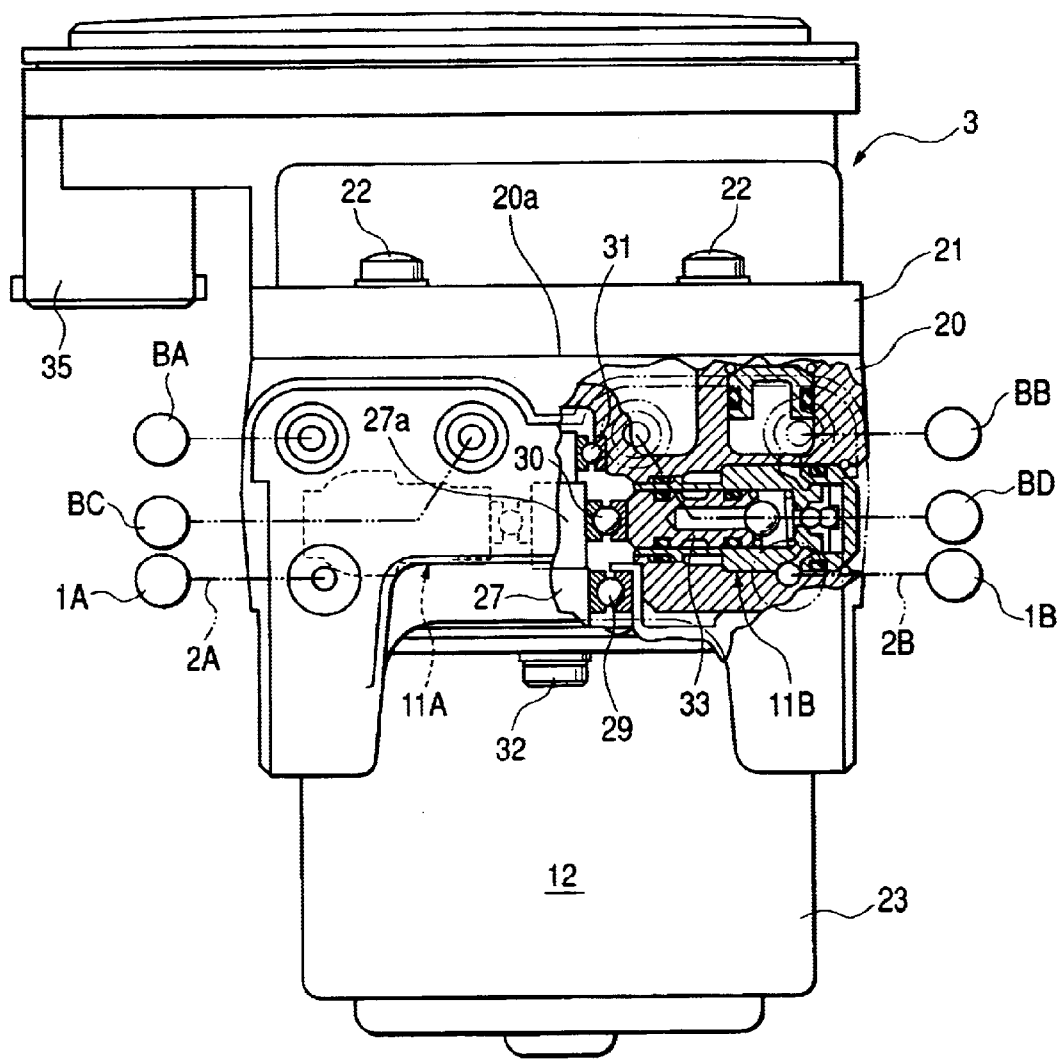
FIG. 2 is a front view, partially cut away, of an anti-lock brake control system.
Figure 3:
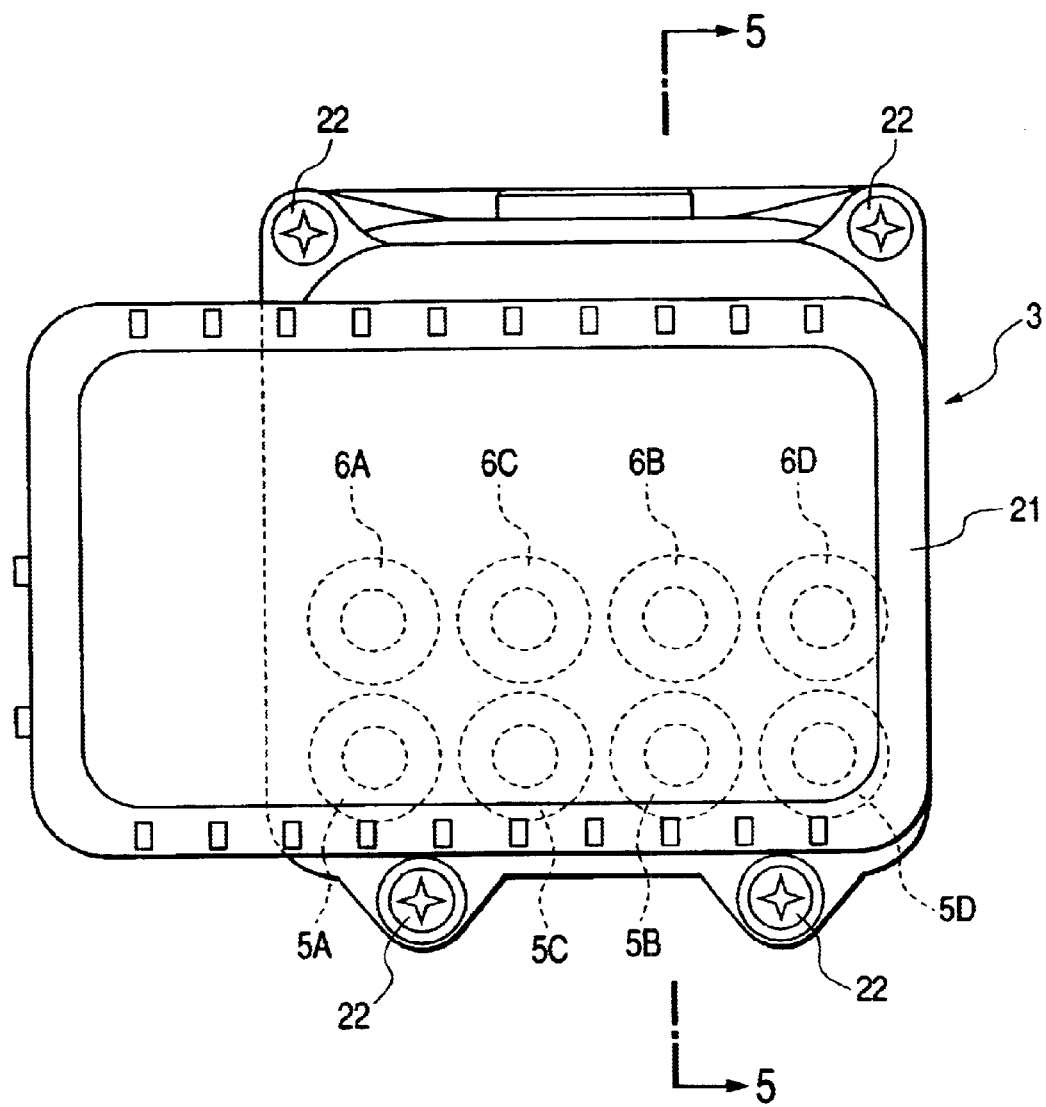
FIG. 3 is a plan view of the anti-lock brake control system.
Figure 4:
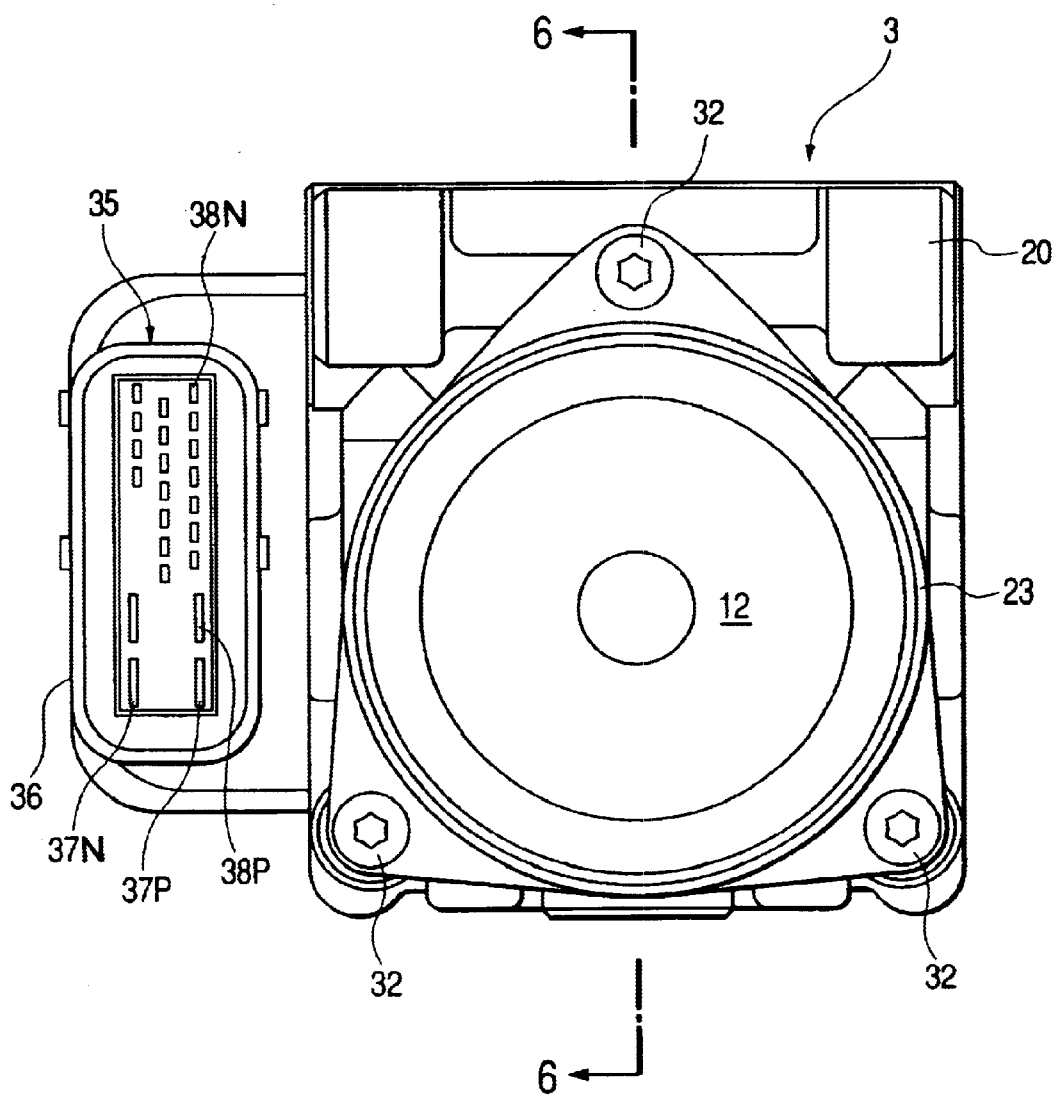
FIG. 4 is a bottom plan view of the anti-lock brake control system.
Figure 5:
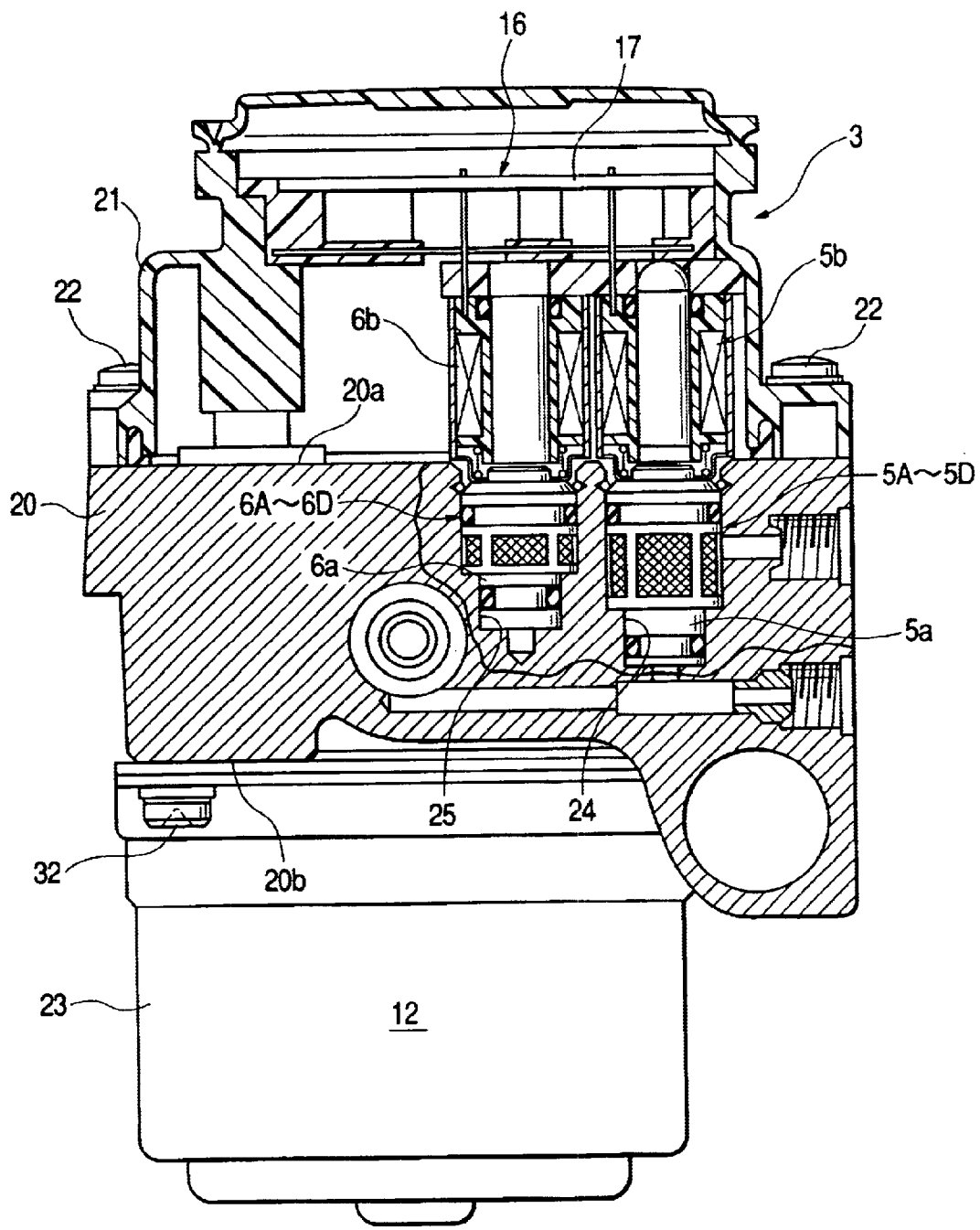
FIG. 5 is a cross-sectional view taken along the line 5—5 of FIG. 3.
Figure 6:
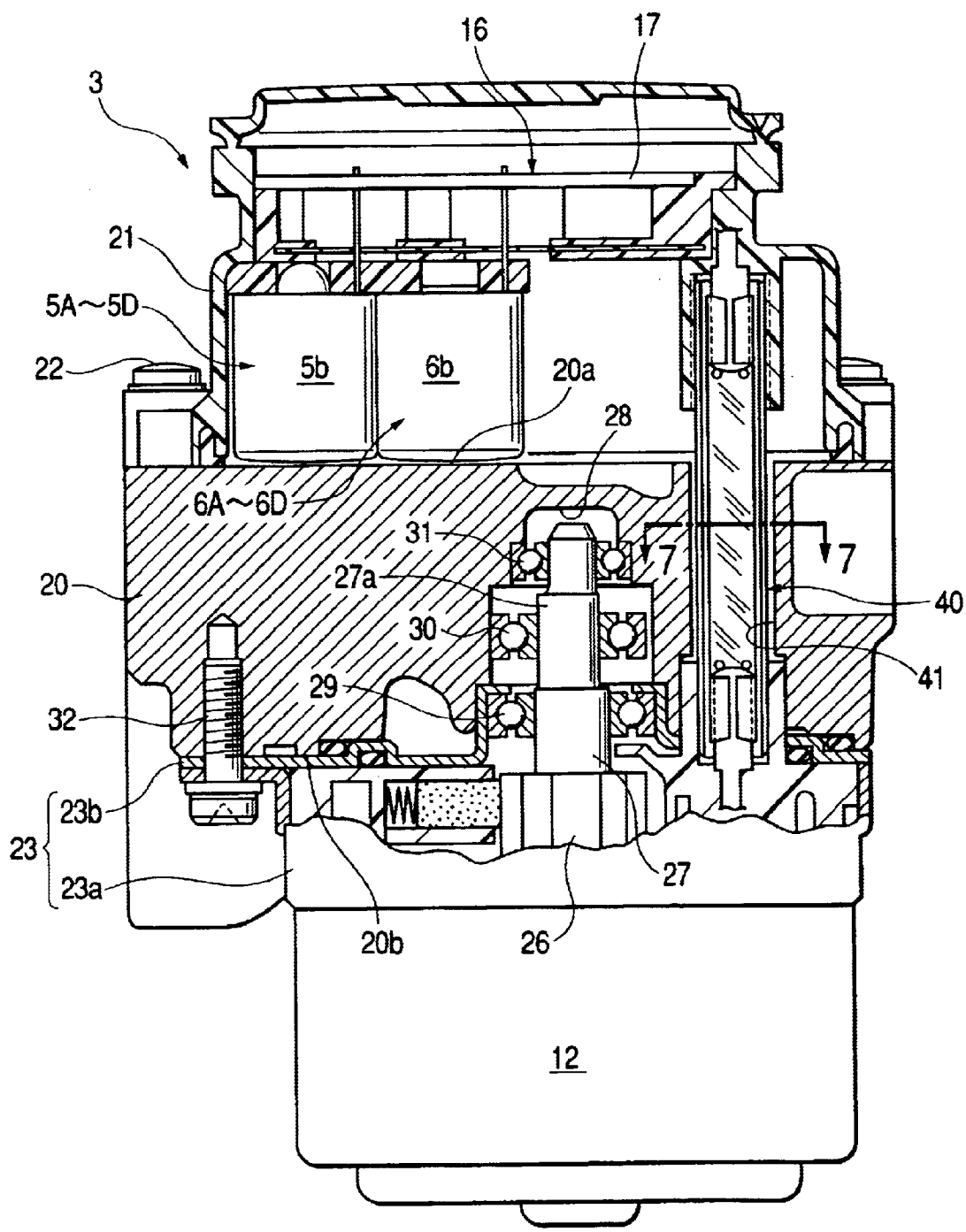
FIG. 6 is a cross-sectional view taken along the line 6—6 of FIG. 4.
Figure 7:
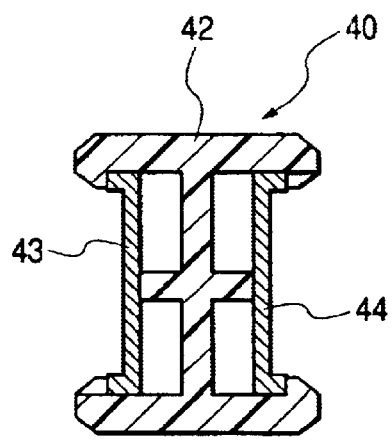
FIG. 7 is a cross-sectional view of a connector taken along the line 7—7 of FIG. 6.
Figure 8:
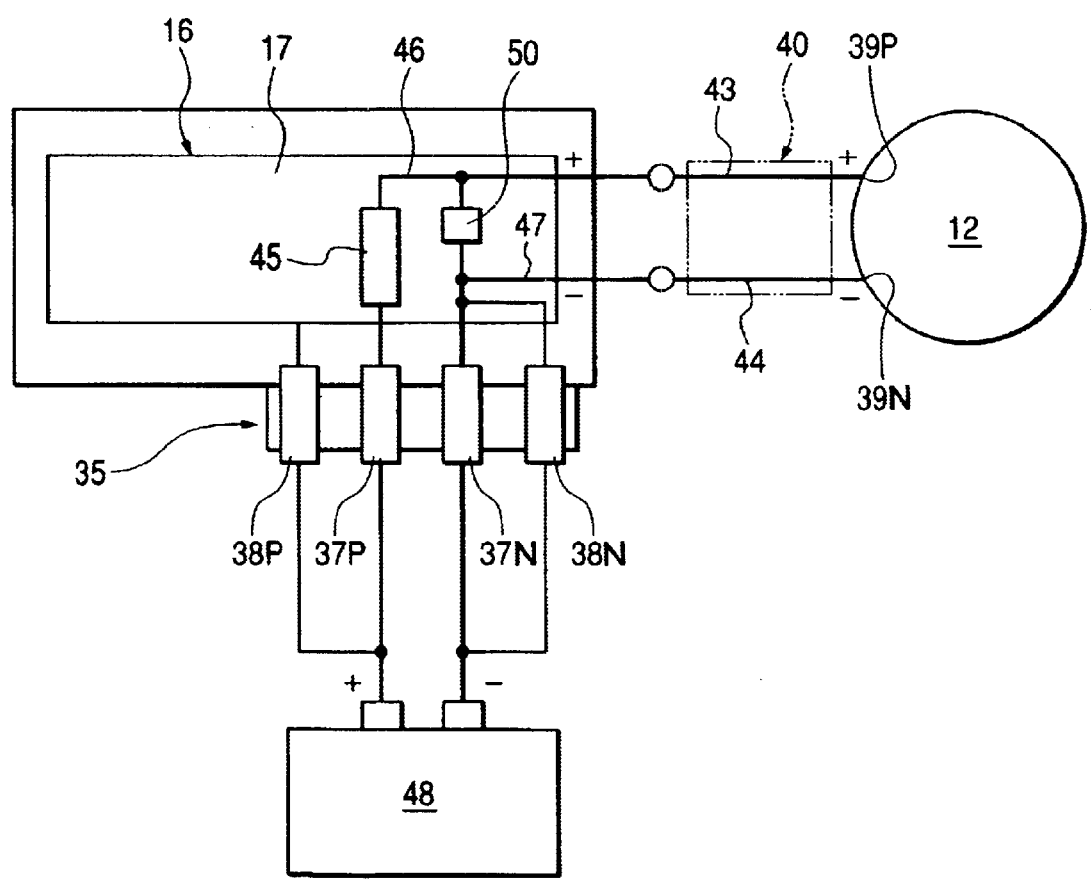
FIG. 8 is a schematic diagram of an electric circuit connecting an electric motor, an electric control unit and a battery.
Figure 9:
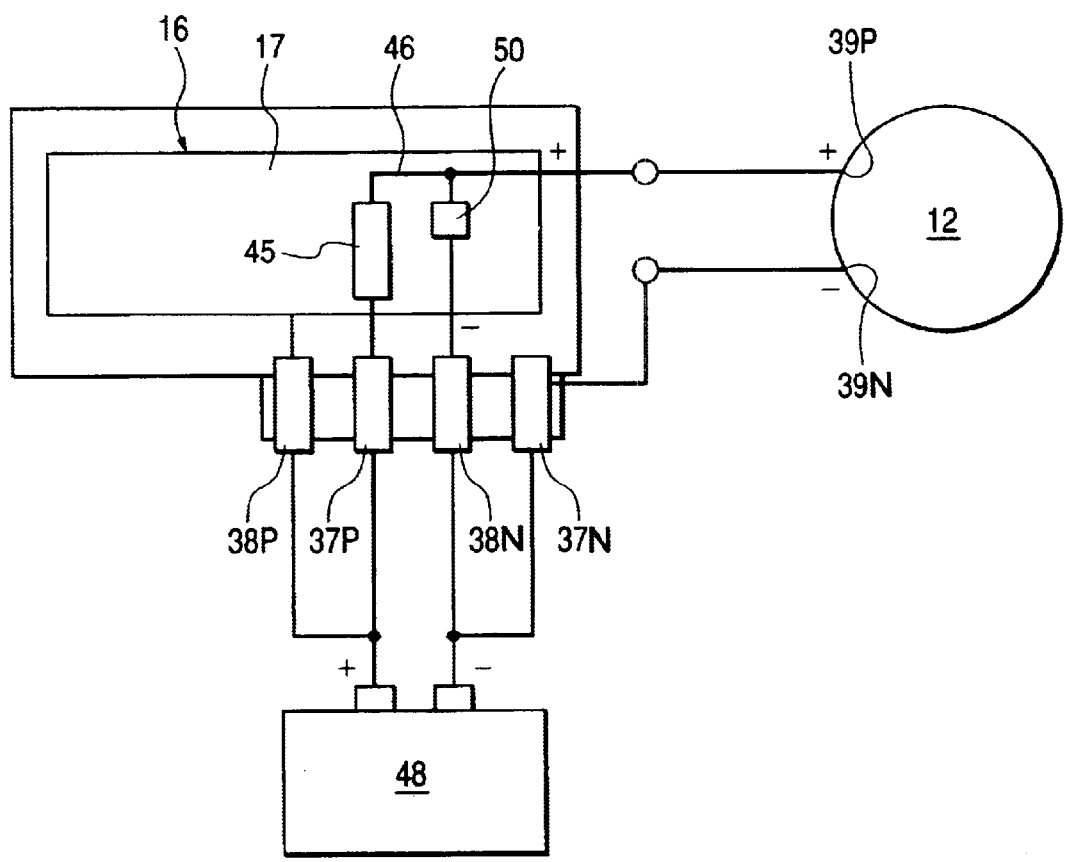
FIG. 9 is a diagram of a conventional electric circuit corresponding to that shown in FIG. 8.

FIGS. 1 to 8 show an embodiment of the invention. FIG. 1 is a brake hydraulic pressure circuit diagram. FIG. 2 is a front view, partially cut away, of an anti-lock brake control system. FIG. 3 is a plan view of the anti-lock brake control system. FIG. 4 is a bottom plan view of the anti-lock brake control system. FIG. 5 is a cross-sectional view taken along the line 5—5 of FIG. 3. FIG. 6 is a cross-sectional view taken along the line 6—6 of FIG. 4. FIG. 7 is a cross-sectional view of a connector taken along the line 7—7 of FIG. 6. FIG. 8 is a schematic diagram of an electric circuit connecting an electric motor, an electric control unit and a battery.

Firstly, in FIG. 1, a tandem master cylinder M comprises first and second output ports 1A, 1B for generating brake hydraulic pressure in response to a pedal effort applied to a brake pedal P. First and second output hydraulic pressure paths 2A, 2B are connected to the output ports 1A, 1B, respectively. Accordingly, the first output hydraulic pressure path 2A is connected to a left front wheel brake BA and a right rear wheel brake BB via an anti-lock brake control system 3 according to the invention. However, the second output hydraulic pressure path 2B is connected to a right front wheel brake BC and a left rear wheel brake BD via the anti-lock brake control system 3.

The anti-lock brake control system 3 comprises first to fourth normally opened electromagnetic valves 5A to 5D, first to fourth check valves 7A to 7D, first to fourth normally closed electromagnetic valves 6A to 6D, first and second reservoirs 8A, 8B, first and second plunger-type hydraulic pumps 11A, 11B, a common electric motor 12, an electronic control unit 16. The first to fourth normally opened electromagnetic valves 5A to 5D correspond to the left front wheel brake BA, the right rear wheel brake BB, the right front wheel brake BC and the left rear wheel brake BD, respectively. The first to fourth check valves 7A to 7D are connected in parallel to the normally opened electromagnetic valves 5A to 5D, respectively. The first to fourth are normally closed electromagnetic valves 6A to 6D which correspond individually to the respective wheel brakes BA to BD. The first and second reservoirs 8A, 8B correspond individually to the respective first and second output hydraulic pressure paths 2A, 2B. The first and second plunger-type hydraulic pumps 11A, 11B are connected to the first and second reservoirs 8A, 8B on intake sides thereof, respectively, and to the first and second hydraulic pressure paths 2A, 2B on discharge sides thereof, respectively. The common electric motor 12 drives both the hydraulic pumps 11A, 11B. The electronic control unit 16 controls the energizing of each of the respective normally opened electromagnetic valves 5A to 5D, each of the normally closed electromagnetic valves 6A to 6D and the electric motor 12.

The first normally opened electromagnetic valve 5A is provided between the first output hydraulic pressure path 2A and the left front wheel brake BA. The second normally opened electromagnetic valve 5B is provided between the first output hydraulic pressure path 2A and the right rear wheel brake BB. The third normally opened electromagnetic valve 5C is provided between the second output hydraulic pressure path 2B and the right front wheel brake BC. The fourth normally opened electromagnetic valve 5D is provided between the second output hydraulic pressure path 2B and the left rear wheel brake BD.

The first to fourth check valves 7A to 7D are connected in parallel to the normally opened electromagnetic valves 5A to 5D, respectively, for permitting the communication of brake fluid from the corresponding wheel brakes BA to BD to a master cylinder M side.

The first normally closed electromagnetic valve 6A is provided between the left front wheel brake BA and the first reservoir 8A. The second normally closed electromagnetic valve 6B is provided between the right rear wheel brake BB and the first reservoir 8A. The third normally closed electromagnetic valve 6B is provided between the right rear wheel brake BB and the first reservoir 8A. The third normally closed electromagnetic valve 6C is provided between the right front wheel brake BC and the second reservoir 8B. The fourth normally closed electromagnetic valve 6D is provided between the left rear wheel brake BD and the second reservoir 8B.

In the anti-lock brake control system 3 constructed as described above, in normal braking where there exists no possibility that the individual wheels are locked, the normally opened electromagnetic valves 5A to 5D are in a non-energized state and are therefore left open, and the normally closed electromagnetic valves 6A to 6D are also in a non-energized state and therefore are left closed. Consequently, brake hydraulic pressure outputted from the first output port 1A of the master cylinder M is applied to the left front wheel brake BA via the first opened electromagnetic valve 5A and to the right rear wheel brake BB via the second normally opened electromagnetic valve 5B. At that time, on the other hand, brake hydraulic pressure outputted from the second output port 1B of the master cylinder M is applied to the right front wheel brake BC via the third normally opened electromagnetic valve 5C and to the left rear wheel brake BD via the fourth normally opened electromagnetic valve 5D.

During the normal braking where the constituent members of the system are left in the states described above, when one or more wheels are nearing lockup condition, the electronic control unit 16 energizes the normally opened electromagnetic valves of the normally opened electromagnetic valves 5A to 5D which correspond to the wheel or wheels that are nearing the lockup condition to close the same valves and also energizes the normally closed electromagnetic valves of the normally closed electromagnetic valves 6A to 6D which correspond to the wheel or wheels that are nearing the lockup condition to open the same valves. This allows part of brake hydraulic pressure to be absorbed by the first or second reservoir 8A, 8B, so that the brake hydraulic pressure is reduced.

In addition, in order to then maintain the brake hydraulic pressure constant, the normally opened electromagnetic valves 5A to 5D may be energized to be closed, and the normally closed electromagnetic valves 6A to 6D may be put in the non-energized condition to be closed. In order to increase the brake hydraulic pressure, the normally opened electromagnetic valves 5A to 5D may be put in the non-energized condition to be opened, and the normally closed electromagnetic valves 6A to 6D may be put in the non-energized condition to be closed.

While anti-lock controlling by the aforesaid anti-lock brake control system is in operation, the electronic control unit 16 energizes and activates the electric motor 12, and brake fluid is taken in from the first and second reservoirs 8A, 8B by the first and second hydraulic pumps 11A, 11B through the operation of the electric motor 12 for reflux to the first and second output hydraulic pressure paths 2A, 2B side. The reflux of brake fluid like this serves to prevent the increase in pedal travel of the brake pedal P caused by absorption of brake fluid by the respective reservoirs 8A, 8B.

Referring to FIGS. 2 to 6, the specific construction of the anti-lock brake control system 3 will be described. The anti-lock brake control system 3 comprises a housing 20, a cover 21 and a motor case 23. The housing 20 is formed of, for example, aluminum alloy. The cover 21 of synthetic resin is joined to one side of the housing 20 with a plurality of bolts 22. The motor case 23 for the electric motor 12 is joined to another side 20b of the housing 20 with a plurality of bolts 32.

The housing 20 accommodates valve portions 5a of the first to fourth normally opened electromagnetic valves 5A to 5D, valve portions 6a of the first to fourth normally closed electromagnetic valves 6A to 6D, the first to fourth check valves 7A to 7D, the first and second reservoirs 8A, 8B and the first and second hydraulic pumps 11A, 11B. The housing 20 are provided with hydraulic pressure paths for the connection between those constituent members 5a, 6a, 7A to 7D, 8A, 8B, 11A, and 11B, respectively.

The valve portions 5a of the first to fourth normally opened electromagnetic valves 5A to 5D are fittingly mounted in mounting holes 24, respectively. The mounting holes 24 are provided in the housing 20 in such a manner as to be opened to the one side 20a thereof. The valve portions 6a of the first to fourth normally closed electromagnetic valves 6A to 6D are fittingly mounted in mounting holes 25, respectively. The mounting holes are also provided in the housing 20 in such a manner as to be opened to the one side 20a thereof. Thus, solenoid portions 5b constituting the respective normally opened electromagnetic valves 5A to 5D in cooperation with the valve portions 5a, respectively and solenoid portions 6b constituting the respective normally closed electromagnetic valves 6A to 6D in cooperation with the valve portions 6a, respectively, are disposed in such a manner as to protrude from the one side 20a of the housing.

Paying attention in particular to FIG. 6, the motor case 23 of the electric motor 12 comprises a bottomed cylindrical case main body 23a and a lid unit 23b for closing an open end of the case main body 23a. The case main body 23a and the lid unit 23b are both fastened to the side 20b of the housing with a plurality of bolts 32.

An output shaft 27 of the electric motor 12 adapted to rotate together with a rotor thereof is inserted into a recessed portion 28 that is formed in the housing 20 so as to be opened to the side 20b thereof. The output shaft 27 is rotatably supported on a ball bearing 29 and a ball bearing 31. The ball bearing 29 is held at the lid unit 23b, and the ball bearing 31 is held at an inner end of the recessed portion 28.

Moreover, an eccentric shaft portion 27a is provided at an intermediate portion along the length of the output shaft 27. A ball bearing 30 is mounted on the outer circumference of the eccentric shaft portion 27.

Plungers 33 of the first and second hydraulic pumps 11A, 11B are disposed in such a manner as to be brought into abutment, respectively, with corresponding portions on an outer circumference of the ball bearing 30 which is mounted on the outer circumference of the eccentric shaft portion 27a. When the output shaft 27 rotates through the operation of the electric motor 12, eccentric motion is imparted to the ball bearing 30 via the eccentric shaft portion 27a, whereby pumping actions are applied to the plungers 33 of both the hydraulic pumps 11A, 11B.

The cover 21 is joined to the side 20a of the housing 20 in such a manner as to cover the solenoid portions 5b of the normally opened electromagnetic valves 5A to 5D and the solenoid portions 6b of the normally closed electromagnetic valves 6A to 6D. The electronic control unit 16 for controlling the energizing of the electric motor 12 and the solenoid portions 5b, 6b is accommodated in the cover 21. A substrate 17 provided on the electronic unit 16 is fixed to the cover 21.

The cover 21 is provided with a coupler 35. The coupler 35 supplies electricity to the solenoid portions 5b of the normally opened electromagnetic valves 5A to 5D, the solenoid portions 6b of the normally closed electromagnetic valves 6A to 6D and the electric motor 12 via the electronic control unit 16. The coupler 35 comprises a box-shaped coupler main body 36 and a plurality of coupler terminals 37P, 37N, 38P and 38N. The box-shaped coupler main body 36 is formed integrally with the cover 21. The plurality of coupler terminals 37P, 37N, 38P and 38N includes a pair of motor coupler terminals 37P, 37N and a pair of substrate coupler terminals 38P, 38N. The plurality of coupler terminals 37P, 37N, 38P and 38N are accommodated and supported in the coupler main body 36.

A through hole 41 is formed in the housing 20 which extends between the side 20a and the side 20b of the housing 20. A connector 40 is inserted in the through hole 41. As shown in FIG. 7, this connector 40 comprises conductors 43, 44 supported on sides of a connector main body 42 of a non-conductive material, respectively. Both the conductors 43, 44 are, as shown in FIG. 8, connected individually to a positive terminal 39P and a negative terminal 39N of the electric motor 12 at one ends thereof, respectively.

In addition, the substrate 17 of the electronic control unit 16 are provided with a positive side conductive line 46 having a relay circuit 45 interposed at a position along the length thereof and a negative side conductive line 47. The positive side conductive line 46 and the negative side conductive line 47 are connected to the other ends of the conductors 43, 44, that is, the positive and negative terminals 39P, 39N of the electric motor 12 at one ends thereof, respectively. In addition, the positive side conductive line 46 and the negative side conductive line 47 continue to the motor coupler terminals 37P, 37N provided on the coupler 35 at the other ends thereof, respectively. Both ends of a battery 48 which is an external power supply are connected to the motor coupler terminals 37P, 37N, respectively.

Additionally, the pair of substrate coupler terminals 38P, 38N is disposed on the coupler 35 in such a manner as to be connected to the ends of the battery 48, respectively. The pair of substrate coupler terminals 38P, 38N is connected to the substrate 17 with the coupler terminal 38N being connected to the negative side conductive line 47 on the substrate 17. Namely, the negative side conductive line 47 functions as a negative side power supply line for the substrate 17.

In order to prevent the generation of noise attributed to electromagnetic waves generated from the electric motor 12 on on-board equipment such as a radio, an electric component 50 which is a capacitor acting as a countermeasure against the noise is mounted on the substrate 17 in such a manner as to provide a connection between the positive side and negative side conductive lines 46, 47.

Next, the operation of the embodiment will be described. The substrate 17 provided in the electronic control unit 16 is provided with the positive side conductive line 46 having the relay circuit 45 and the negative side conductive line 47. The relay circuit 45 is interposed at the position along the length thereof, and has one end connected to the electric motor 12. The negative side conductive line 47 also has one end connected to the electric motor 12. In addition, the capacitor 50 is mounted on the substrate 17 in such a manner as to provide a connection between the positive side and negative side conductive lines 46, 47.

Consequently, the capacitor 50 acting as a countermeasure against the noise is connected in parallel to the electric motor 12, whereby noise attributed to electromagnetic waves generated from the electric motor 12 can be prevented from being generated on on-board equipment such as a radio.

Moreover, the negative side conductive line 47 can function as the negative side power supply line for the substrate 17. The positive side and negative side conductive lines 46, 47 are connected to the pair of motor coupler terminals 37P, 37N provided on the coupler 35 at the other ends thereof, respectively. Further, the motor coupler terminals 37P, 37N are connected to the ends of the battery 48. Accordingly, there occurs no case where only the substrate 17 side is put in a non-grounded state. Thus, the relay circuit 45 on the substrate 17 is prevented from becoming unstable, and the possibility can be eliminated that the electric motor 12 is activated unintentionally.

While the embodiment of the invention has been described heretofore, the invention is not limited to the embodiment, but various modifications to the design of the anti-lock brake control system may be made without departing from the scope of the invention which is defined by the appended claim.

Thus, according to the invention, it is possible to prevent noise attributed to electromagnetic waves generated from the electric motor from being generated on on-board equipment such as a radio, and moreover there exists no case where only the substrate side is put in a non-grounded condition and therefore there occurs no risk that the relay circuit on the substrate becomes unstable, whereby the possibility can be eliminated that the electric motor is activated unintentionally.

What is claimed is:

1. An automotive anti-lock brake control system comprising:
   electromagnetic valves, having valve portions and solenoid portions for controlling brake hydraulic pressures of wheel brakes, respectively;
   hydraulic pumps for generating the brake hydraulic pressures;
   a housing accommodating the valve portions and the hydraulic pumps, wherein the solenoid portions protrude from one side of the housing,
   an electric motor joined to another side of the housing for driving the hydraulic pumps;
   an electronic control unit for controlling the energizing of the electric motor and the solenoid portions;
   a cover joined to the one side of the housing for covering the solenoid portions and the electronic control unit;
   a coupler provided on the cover for connection with an external electric circuit, the coupler having positive and negative motor coupler terminals which are connected to ends of an external power source respectively;

a substrate provided in the electronic control unit;

a positive side conductive line having one end connected to a positive terminal of the electric motor and the other end connected to the positive motor coupler terminal, the positive side conductive line having a relay circuit interposed at a position along the length thereof, and the positive side conductive line provided on the substrate;

a negative side conductive line having one end connected to a negative terminal of the electric motor and the other end connected to the negative motor coupler terminal, the negative side conductive line provided on the substrate so as to function as a negative side power supply line for the substrate; and an electric component mounted on the substrate for preventing a generation of noise attributed to the electric motor, the electric component connecting the positive side conductive line to the negative side conductive lines.

2. The automotive anti-lock brake control system according to claim 1, wherein said electric component is a capacitor.

3. The automotive anti-lock brake control system according to claim 1, wherein said external power source is a battery.

4. The automotive anti-lock brake control system according to claim 1, wherein the coupler comprises a box-shaped coupler main body and a plurality of coupler terminals.

5. The automotive anti-lock brake control system according to claim 4, wherein the box-shaped coupler main body is formed integrally with the cover.

6. The automotive anti-lock brake control system according to claim 4, wherein the plurality of coupler terminals includes a pair of motor coupler terminals and a pair of substrate coupler terminals.

7. The automotive anti-lock brake control system according to claim 6, wherein the plurality of coupler terminals are accommodated and supported in the coupler main body.

8. The automotive anti-lock brake control system according to claim 6, wherein the positive side conductive line and the negative side conductive line continue to the pair of motor coupler terminals and the external power source are connected to the motor coupler terminals.

9. The automotive anti-lock brake control system according to claim 6, wherein the pair of substrate coupler terminals is disposed on the coupler and connected to ends of the external power source, the pair of substrate coupler terminals are connected to the substrate with a first coupler terminal connected to the negative side conductive line on the substrate.

10. The automotive anti-lock brake control system according to claim 9, wherein the negative side conductive line functions as a negative side power supply line for the substrate such that the relay circuit on the substrate is prevented from becoming unstable, and a unintentional activation of the electric motor eliminated.

* * * * *